US007962617B2

(12) United States Patent
Chevalier et al.

(10) Patent No.: US 7,962,617 B2
(45) Date of Patent: *Jun. 14, 2011

(54) SYSTEM FOR BILLING NETWORK ACCESS CAPACITIES SHARED BETWEEN INTERNET SERVICE PROVIDERS

(75) Inventors: Denis Chevalier, La Colle sur Loup (FR); Gérard Marmigere, Drap (FR); Sophie Martin, La Gaude (FR); Zsolt Szalai, Tourrettes sur Loup (FR)

(73) Assignee: International Business Machines Corporation, Armonk, NY (US)

( * ) Notice: Subject to any disclaimer, the term of this patent is extended or adjusted under 35 U.S.C. 154(b) by 192 days.

This patent is subject to a terminal disclaimer.

(21) Appl. No.: 12/351,922

(22) Filed: Jan. 12, 2009

(65) Prior Publication Data

US 2009/0125624 A1 May 14, 2009

Related U.S. Application Data

(63) Continuation of application No. 10/843,922, filed on May 12, 2004, now Pat. No. 7,480,371.

(30) Foreign Application Priority Data

May 13, 2003 (EP) ..................................... 03368046

(51) Int. Cl.
*G06F 15/173* (2006.01)

(52) U.S. Cl. .......................... 709/225; 709/223; 709/224

(58) Field of Classification Search .................. 709/223, 709/224, 225
See application file for complete search history.

(56) References Cited

U.S. PATENT DOCUMENTS

| 6,453,301 | B1 | 9/2002 | Niwa |
| 7,082,463 | B1 | 7/2006 | Bradley et al. |

OTHER PUBLICATIONS

USPTO, Office Action, U.S. Appl. No. 10/843,922, filed May 12, 2004, Notification Date: Mar. 27, 2008.

*Primary Examiner* — John Follansbee
*Assistant Examiner* — Nghi V Tran
(74) *Attorney, Agent, or Firm* — Andrea Bauer; Hoffman Warnick LLC

(57) ABSTRACT

For optimizing Internet access resources, a system for billing network access capacities shared across Internet service providers is disclosed. A Client Service Provider (CSP) may rent access on Points Of Presence belonging to a Master Service Provider (MSP) while maintaining a constant security level and providing connection accounting. When a CSP's subscriber sends an access request to a MSP, the MSP analyzes the subscriber's realm and checks the capacities allocated to the subscriber's CSP. If connection is allowed, the MSP sends an authentication request to the CSP. If the subscriber is authenticated, the MSP launches an accounting process based on the subscriber's realm while the CSP may launch an accounting process associated with the subscriber identifier. The cost of rented Points Of Presence capacity is based on total connection time and on the number of simultaneous connections established by the MSP for the CSP, combined with predetermined thresholds.

5 Claims, 7 Drawing Sheets

| realm | start time | billing level |
|---|---|---|
| CSP_1 | t1 | $R_1$ |
| CSP_1 | t2 | $R_1$ |
| CSP_2 | t3 | $R'_1$ |
| CSP_1 | t4 | $R_2$ |
| .... | .... | .... |
| CSP_2 | tn | $R'_1$ |

(a)

| realm | $\theta_1$ | $\theta_2$ | $\theta_3$ | $t(R_1)=$ $t(0<n<\theta_1)$ | $t(R_2)=$ $t(\theta_1<n<\theta_2)$ | $t(R_3)=$ $t(\theta_2<n<\theta_3)$ | n_connect |
|---|---|---|---|---|---|---|---|
| CSP_1 | $\theta_1^1$ | $\theta_2^1$ | $\theta_3^1$ | 2h12'15" | 0h52'18" | 0h12'49" | 48 |
| CSP_2 | $\theta_1^2$ | $\theta_2^2$ | $\theta_3^2$ | 0h54'43" | 0h37'48" | 0h0'0" | 37 |
| .... | .... | .... | .... | .... | ..... | .... | .... |
| CSP_n | $\theta_1^n$ | $\theta_2^n$ | $\theta_3^n$ | 10h27'03" | 2h23'29" | 0h18'12" | 15 |

(b)

SYSTEM FOR BILLING NETWORK ACCESS CAPACITIES SHARED BETWEEN INTERNET SERVICE PROVIDERS

CROSS-REFERENCE TO RELATED APPLICATIONS

This application is a Continuation application of U.S. patent application Ser. No. 10/843,922, filed on May 12, 2004, and entitled "Method and System for Billing Network Access Capacities Shared Between Internet Service Providers," now U.S. Pat. No. 7,480,371, which is incorporated herein by reference.

FIELD OF THE INVENTION

The present invention relates generally to the accessing of distributed computing network environments and more specifically to a system for billing Internet network access points shared between independent Internet Service Providers.

BACKGROUND OF THE INVENTION

Recently, communications between computer systems for data and information exchange has been significantly developing thanks to the Internet, which is known to have rapidly spread on a global level by virtue of being supported by public communications networks, both traditional and technologically advanced, such as ISDN, ADSL, GPRS, and others.

Success of this phenomenon is indeed due, also, to the availability, in real time and affordably, of information and data stored on servers located all over the globe and internetworked so that they are reachable through the various last mile network access services.

As regards the price of operations on the net, it has to be considered that it is directly bonded to the cost of the access connection from a user's computer to the access point into the net. The network access points are identified, for example by telephone numbers which are made available to the users by each Internet Service Provider (ISP), in order to allow the connection to the Provider's computers, which are part of the network. As it is known, their primary function is to support Internet access for their subscribers. For this, they maintain a subscribers database which stores all users' identification data. In addition, they typically offer value-added services such as electronic mail, access to sites of the net by assisted, or not, search procedures, storage space for user personal data, commercial news or other information news visible to all users of the net, and other services.

Thanks to these services' quality and diversity and also to a growing variety of end-user devices supporting access to the Internet, such as computers, advanced means interfacing TV sets, mobile telephone apparatuses, Personal Digital Assistants, etc., the number of Internet users has been increasing very rapidly. Therefore, the relevance is easily understandable of getting quickly connected to the net through affordable access points, that is points included in the user's telephone district or area, or in very near areas.

In order to better understand the difficulties that can be associated with the above, it has to be considered that, looking at the current connection modalities, the user has to choose a specific Internet Service Provider. The chosen ISP identifies the user through specific identification data. For the connection, the Internet Service Provider publishes a set of access numbers, for example telephone numbers, which point to the ISP's Points of Presence and can be stored in memory means of the user's apparatus connecting to the net. For connection cost minimization, it is important that an access number can be selected which coincides with the provider's access points nearest to the place where the connecting apparatus is located.

FIG. 1 illustrates schematically the accessing of data on Internet network 100, a distributed computing network environment. The participants in the Internet are a wide variety of machines, owned by a wide variety of organizations and individuals, all able to communicate and share information. For example, the Internet network 100 includes a plurality of Internet sites 105-1 to 105-$q$. These Internet sites are generally operated by corporations, universities, and governmental organizations. Each Internet site may include one or more repositories of information and resources that may be accessed over the Internet. Each Internet site e.g., 105-1 and 105-$q$, may include a plurality of WEB servers e.g., 110-1 to 110-$r$ and 110'-1 to 110'-$n$, respectively. Each of these WEB servers may provide a "home page" to be visited, files to be read or downloaded, applications to be shared, and the like.

The Internet network 100 also includes multiple points of presence (POPs) 115-1 to 115-$s$ that are operated by Internet Service Providers (ISPs). These ISPs are in the business of providing Internet access to end-user stations, generically referred to as 120. As mentioned above, the costs of the telephone connection between a user's computer and an access point to the net represent an important part of the Internet connection costs and thus, the geographical locations and distribution of the POPs 115-1 to 115-$s$ are important. For sake of illustration, it is assumed that POPs 115-1 to 115-3 belong to a first geographical location, referred to as 125-1, and POP 115-$s$ belongs to a second geographical location, referred to as 125-2.

As it is apparent from FIG. 1, two problems may arise when a user needs to set a connection with the ISP whom he has a supplying contract with. Firstly, if the POP of the ISP is located in the second geographical location 125-2 while the user is temporarily located in the first geographical location 125-1, the communication costs between the user and the point of presence will increase. Secondly, if the closest POP is saturated, the user wanting to nonetheless connect must select another POP, possibly in a different communications district, which would increase communication costs. For example, if POPs 115-3 and 115-$s$ belong to the same ISP and the user is located in the first geographical location 125-1, he may be forced to set the connection with POP 115-$s$ when POP 115-3 is saturated. This situation may arise even though POPs 115-1 and 115-2 do have capacity available since these POPs really belong to other ISPs.

Likewise, the subscribers of ISPs that have constrained access infrastructure capacity (low-density POPs distribution, limited Network Access Point capacity, etc.) may experience difficulties and sub-optimal costs when establishing connections.

While these problems may certainly be avoided by improving geographical distribution of POPs and increasing the number and capacity of POPs for each ISP, this may not be practical due to the required expenses and ISP investment potential realities. As a conclusion, there is a need for a method and system for sharing points of presence between Internet Service Providers wherein the use of these shared points of presence may be billed efficiently.

SUMMARY OF THE INVENTION

Thus, it is a broad object of the invention to remedy the shortcomings of the prior art as described above.

It is another object of the invention to provide a system for billing network access capacities shared between independent Internet Service Providers.

It is a further object of the invention to provide a system for billing network access capacities shared between Internet Service Providers wherein the billing is based upon the number and the duration of connections.

Further advantages of the present invention will become apparent to the ones skilled in the art upon examination of the drawings and detailed description. It is intended that any additional advantages be incorporated herein.

BRIEF DESCRIPTION OF THE DRAWINGS

FIGS. 10a and 10b, shows an example of the connection table and the threshold table that are used for billing CSPs.

DETAILED DESCRIPTION OF THE INVENTION

According to the invention, a Service Provider, typically an Internet Service Provider (ISP) or Application Service Provider (ASP), referred to as "Master SP" or MSP in the following description, owning a large infrastructure, could rent out part of its network access capacity to a third party service provider, referred to as "Client SP" or CSP, having its own infrastructure, that requires additional capacity at peak times or needs to increase geographical coverage through additional Points Of Presence (POP). To maintain a constant security level and provide connection billing basis, sharing of points of presence is based on the following items:

the Master SP identifies incoming access requests into its network which are really meant for the Client SP in order to route the session appropriately;

the master SP sends a request to the Client SP to check authorization of Client SP's subscribers upon incoming access requests of these Client SP's subscribers (information of Client SP's subscribers are not stored in the Master SP databases)

the Master SP tracks sessions coming in through its POP's and meant for the Client SP in order to bill the Client SP based on actual usage.

the Master SP controls in real-time the capacity allocated to its Client SP's to pre-vent impact on the quality of the service offered to its own subscribers;

the Client SP retains the same level of control and ownership on its subscribers' sessions whether they come in through its own or through the Master SP POP.

Figure 1:
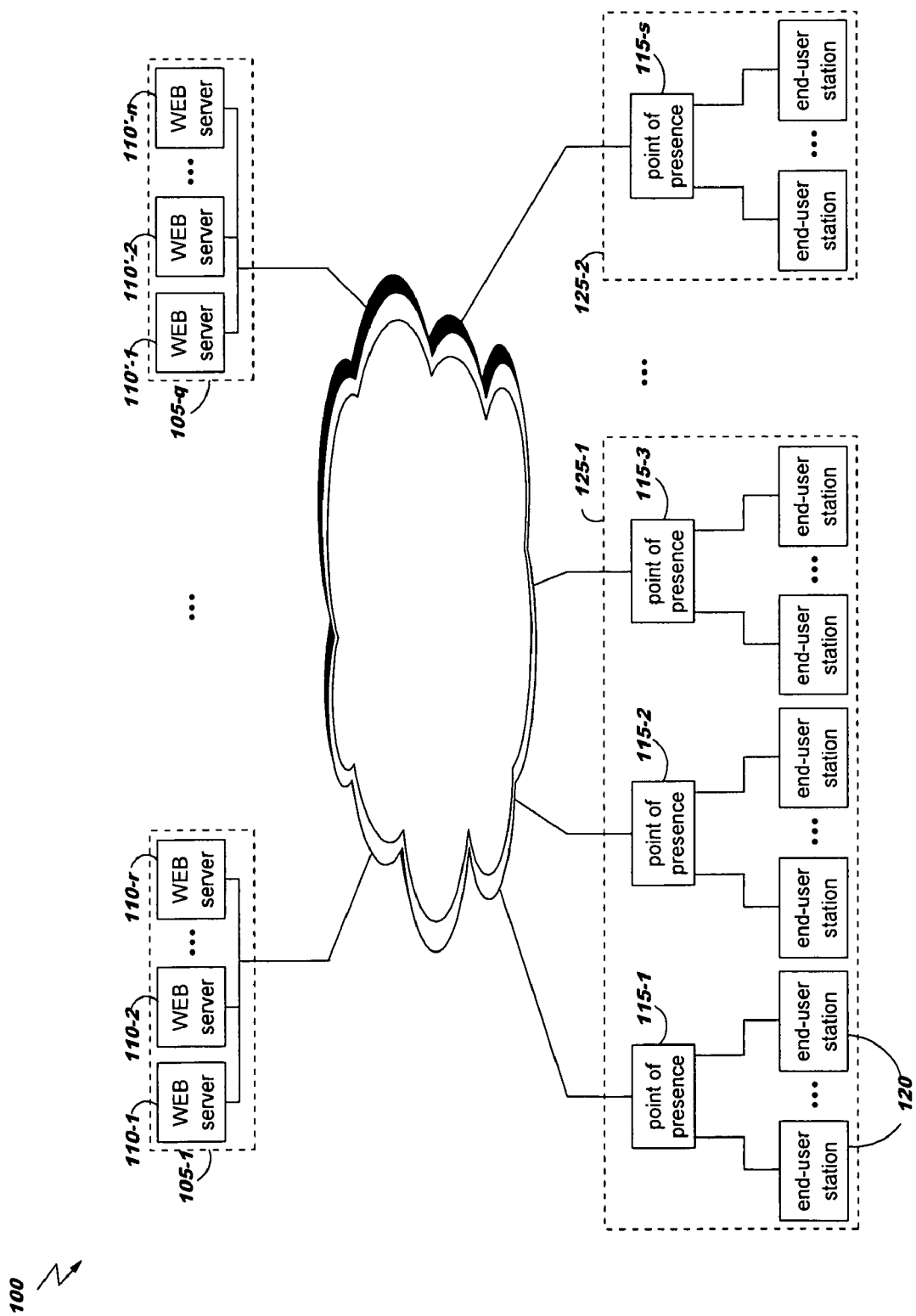
FIG. 1 illustrates schematically the accessing of data on an Internet network, wherein the invention could be implemented.
Figure 2:
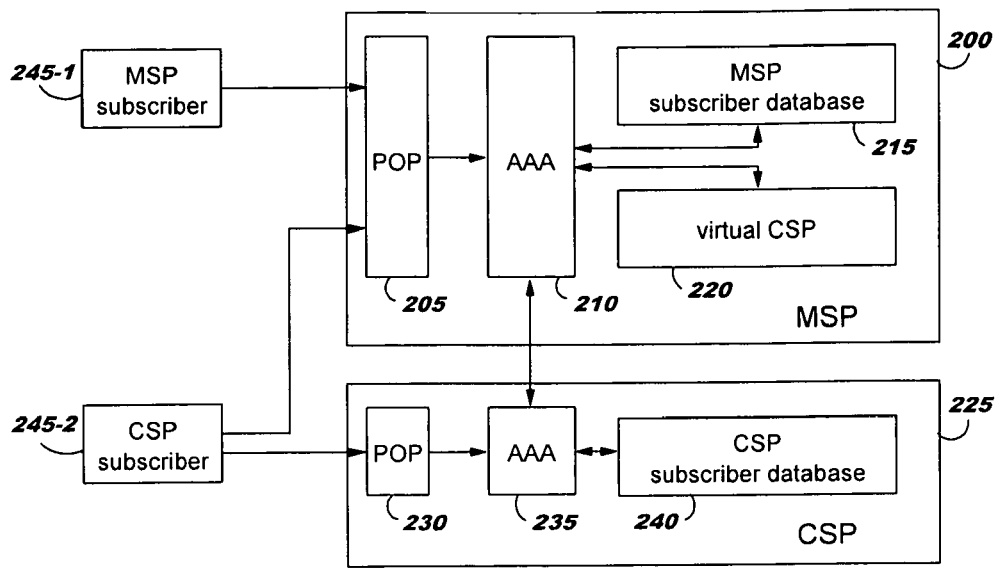
FIG. 2 shows schematically the authentication, authorization, and accounting mechanism in the Master and Client Service Providers when access requests are received.

The main principle of sharing points of presence consists in the creation of a "Virtual Subscriber" that represents Client SPs in the Master SP system, as illustrated on FIG. 2. FIG. 2 illustrates schematically the Authentication, Authorization, and Accounting mechanism (AAA) in the Master and Client SPs when access requests are received. Master SP 200 comprises a POP 205, an AAA mechanism 210, a database 215 containing information about its subscribers, and a database 220 for virtual subscribers i.e., Client SPs. Likewise, Client SP 225 comprises a POP 230, an AAA mechanism 235, and a database 240 containing information about its subscribers. A standard Client SP does not contain a database for virtual subscribers. However, it must be noticed that a SP may be simultaneously a Master and a Client SP. In such case, the Client/Master SP contains a database for virtual subscribers, i.e., Client SPs of the Client/Master SP.

When a Master SP's subscriber 245-1 requests an access to Master SP 200 through POP 205 or when a Client SP's subscriber 245-2 requests an access to Client SP 225 through POP 230, AAA mechanisms are used as standard. In such a case, the POP send a request to the AAA module that compares subscriber information e.g., subscriber identifier and password, with the one stored in the subscriber database. If information matches, the connection is established. Else, the connection is rejected.

Figure 3:
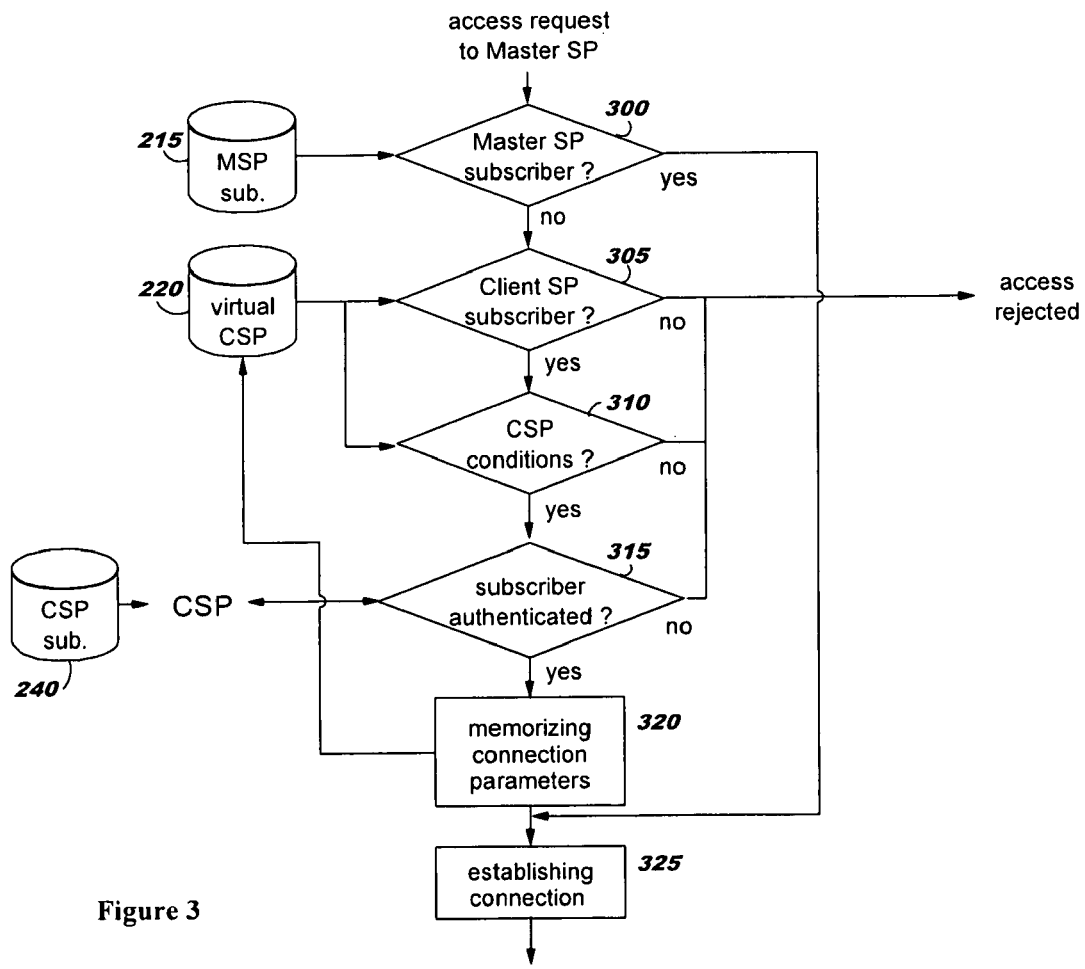
FIG. 3 illustrates an example of the algorithm used for establishing a connection between a subscriber and a Master Service Provider's point of presence.

FIG. 3 illustrates an example of the algorithm used for establishing a connection between a subscriber 245-1 or 245-2 and a POP of the Master SP's 200. When the Master SP 200 receives an access request, a first test is performed to determine if it comes from a Master SP's subscriber (step 300), using the database 215 of Master SP's subscribers. If the access request comes from a Master SP's subscriber, the connection is established (step 325) after this subscriber has been authenticated and authorized. This authentication/authorization is a standard authentication/authorization process, e.g., verifying the password associated with the subscriber identifier using the database 215. If the access request does not come from a subscriber of the Master SP, a test is performed to determine whether or not it comes from a subscriber of a Client SP (step 305). This test is done by using the database 220 of the virtual CSPs, by analyzing the subscriber's realm (Master SP does not store information relative to Client SP's subscribers). If the realm of the subscriber does not correspond to any Client SP, the access request is rejected. Else, a new test is performed to determine whether or not a subscriber of the corresponding Client SP can be allowed to establish a connection from the Master SP (step 310). This test, based on the Virtual SP's status, consists in checking access capacities allocated to Client SP 225, e.g., are there enough free ports for the CSP, has the CSP not exceeded its credit threshold, has the MSP not suspended business with CSP? Such Virtual SP's status is stored in database 220. If a connection is not allowed for reasons related to the Client SP, the access request is rejected.

Else, if connection is allowed, another test is performed to authenticate the subscriber and determine if Client SP authorizes the connection (step 315). To that end, the Master SP sends a request to the Client SP with the information received in the subscriber's request, e.g., subscriber identifier and password. As mentioned above, information relative to Client SP's subscriber is not stored in any Master SP database and thus, the Master SP can not authenticate Client SP's subscribers. Using its database 240, the Client SP authenticates the subscriber having sent the access request to the Master SP and notifies the Master SP of the result, success or failure, of the authentication. Such authentication process is standard. If the subscriber is not authenticated, the connection is rejected. Else, connection parameters are stored in the database 220 of the virtual SP (step 320) and the connection is established (step 325).

Even though Client SP is identified using the realm of the subscriber having sent the request in the previous description, other means may be used such as using the called-number or the name of the network access server when a called-number or a network access server are allocated to the connection of Client SP's subscribers.

Figure 4:
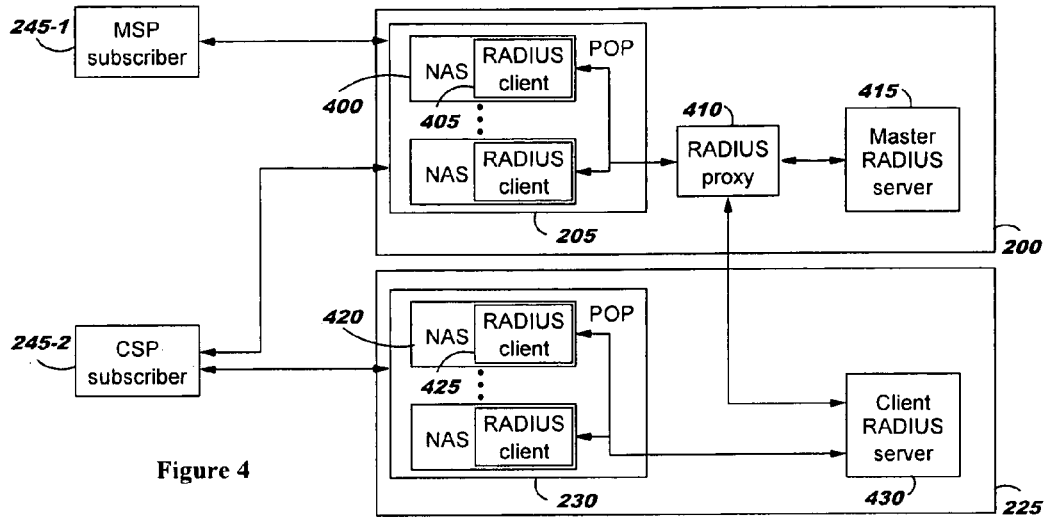
FIG. 4 depicts schematically an implementation of the method for sharing points of presence when using the RADIUS protocol.

The implementation of sharing points of presence capabilities may be based on the RADIUS protocol, by creating a RADIUS proxy between the Master SP POP, containing the RADIUS Client, and the Master SP RADIUS server and Client SP RADIUS server, as illustrated on FIG. 4. The RADIUS protocol is described, for example, in "Remote Authentication Dial In User Service (RADIUS)" (Rigney, C., Willens, S., Rubens, A. and W. Simpson, RFC 2865, June 2000) and "RADIUS Accounting" (Rigney, C., RFC 2866, June 2000).

Turning now to FIG. 4, which illustrates schematically the implementation of sharing points of presence capabilities when using RADIUS protocol, there is shown the Master and Client SPs 200 and 225 as well as MSP and CSP subscribers 245-1 and 245-2 of FIG. 2. Master SP 200 comprises the POP 205 that includes a set of Network Access Servers (NAS), generically referred to as 400. Each NAS 400 controls a plurality of modems (not represented for sake of clarity) that interface subscriber systems to Master SP 200. In this implementation example, each NAS 400 comprises a RADIUS client, generically referred to as 405, to handle subscriber's requests. A RADIUS proxy 410 links RADIUS clients 405 to a Master RADIUS server 415 and a Client RADIUS server 430. RADIUS proxy 410 determines which RADIUS server must be accessed. Likewise, Client SP 225 comprises the POP 230 that includes a set of NAS, generically referred to as 420, that interface subscriber systems to Client SP 225. Again for illustration purposes, each NAS 420 includes a RADIUS client, generically referred to as 425. Client RADIUS server 430 may be accessed either by RADIUS clients 425 or RADIUS proxy 410.

Figure 5:
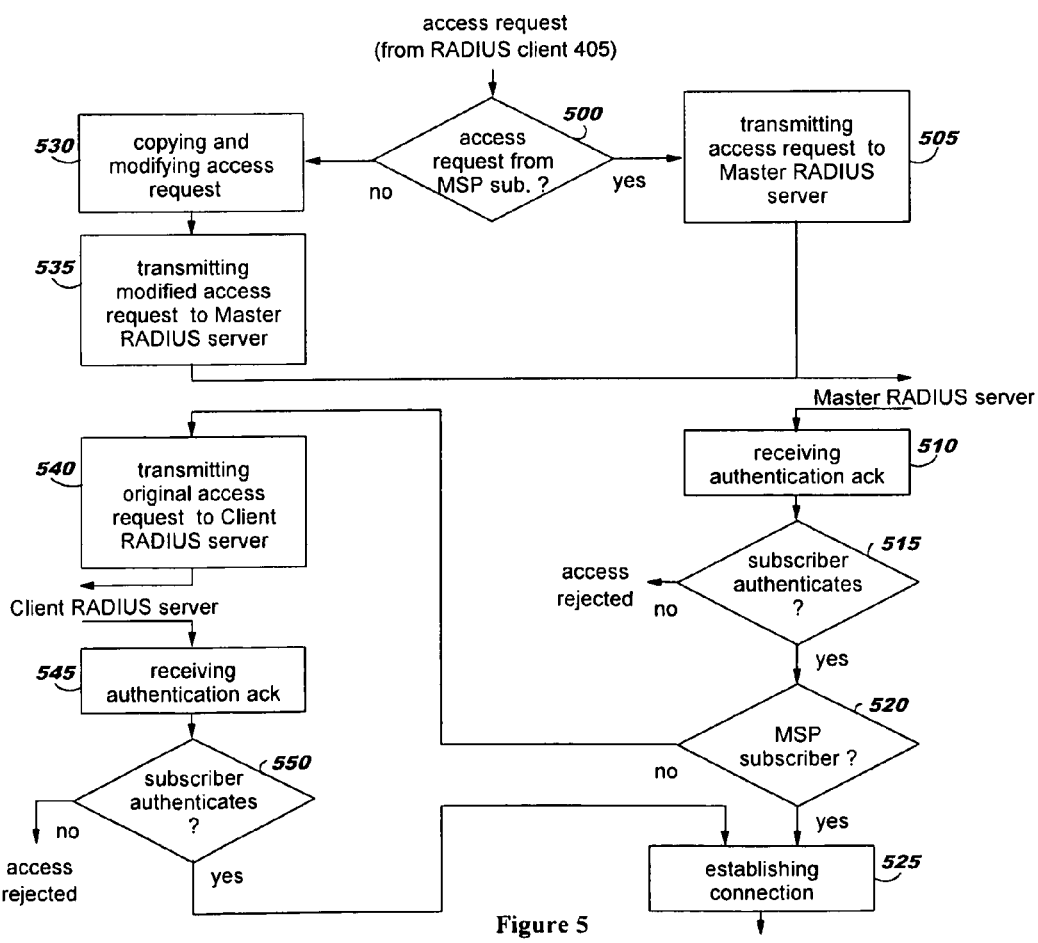
FIG. 5 illustrates an algorithm that may be used in the RADIUS proxy for sharing points of presence.

FIG. 5 depicts an algorithm that may be implemented in RADIUS proxy 410. When an access request is received from a RADIUS client 405, a first test is performed to determine whether or not the request is received from a Master SP's sub-scriber (step 500). If the request has been sent by a Master SP's subscriber, the request is transmitted to the Master RADIUS server 415 (step 505). Upon reception of an authentication acknowledgment from the Master RADIUS server (step 510), a second test is performed to determine whether or not the subscriber has been authenticated (step 515). If the subscriber has not been authenticated, the access request is rejected, else another test is conducted to determine if the subscriber is a Master SP's subscriber or not (step 520). If the subscriber is a Master SP's subscriber, the connection is established and accounting may start (step 525).

If the access request has not been sent by a Master SP's subscriber (step 500), the access request is copied and modified (step 530). The modification of the access request comprises the step of removing the subscriber identifier and password that are replaced by a virtual subscriber identifier and password. A virtual subscriber identifier and password are assigned to each Client SP of the Master SP 200, based on the realm. Then, the modified access request is transmitted to the Master RADIUS server 415 (step 535). Upon reception of an authentication acknowledgement from the Master RADIUS server (step 510), the second test is performed as described previously to determine whether or not the (virtual) subscriber, representing the CSP, has been authenticated (step 515). If the (virtual) subscriber has not been authenticated, the access request is rejected. Else, the other test is conducted to determine if the subscriber is a Master SP's subscriber or not (step 520). If the subscriber is not a Master SP's subscriber, the original access request is transmitted to Client RADIUS server 430 within the CSP for subscriber authentication purposes (step 540). Upon reception of an authentication acknowledgement from the Client RADIUS server (step 545), a test is performed to determine whether or not the subscriber is authenticated (step 550). If the subscriber is not authenticated, the access request is rejected. In such a case, the virtual subscriber identifier and password are replaced by the real ones before the reject access message is transmitted to the NAS. Else, if the subscriber is authenticated, the connection is established and accounting, e.g., connection duration and number of connections established for corresponding Client SP, may start (step 525).

As mentioned above, determining if a subscriber is a Master SP' sub-scriber or a Client SP's subscriber may be based on subscriber's realm or any equivalent information.

Figure 6:
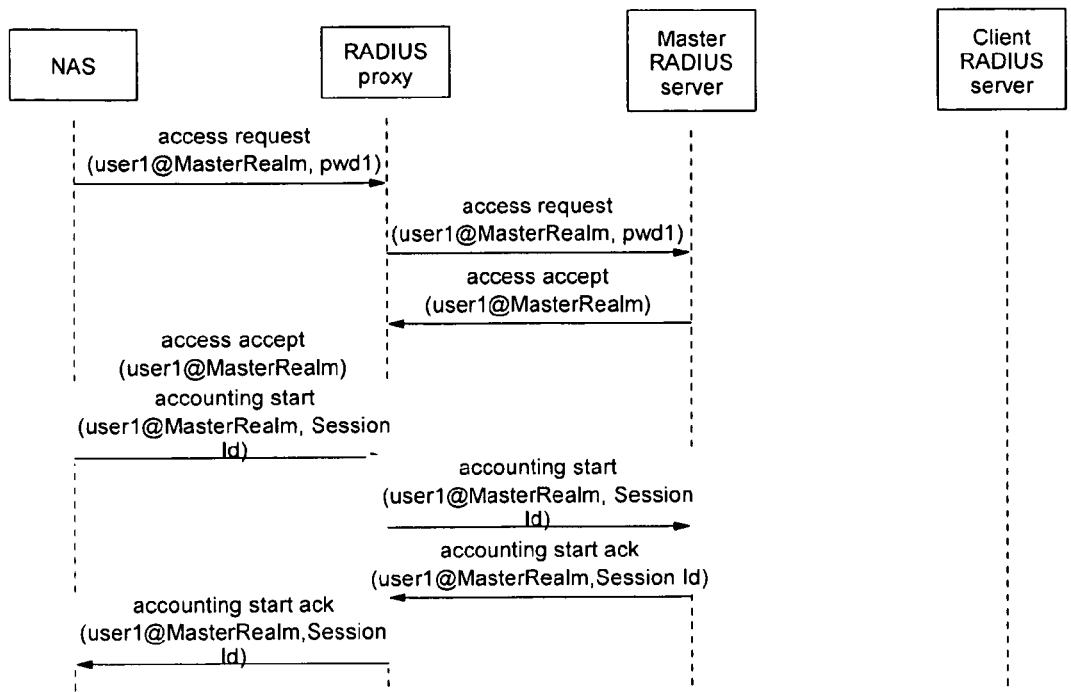
FIGS. 6 and 7 show timing analysis examples of a connection process based on the algorithm of FIG. 5.
Figure 7:
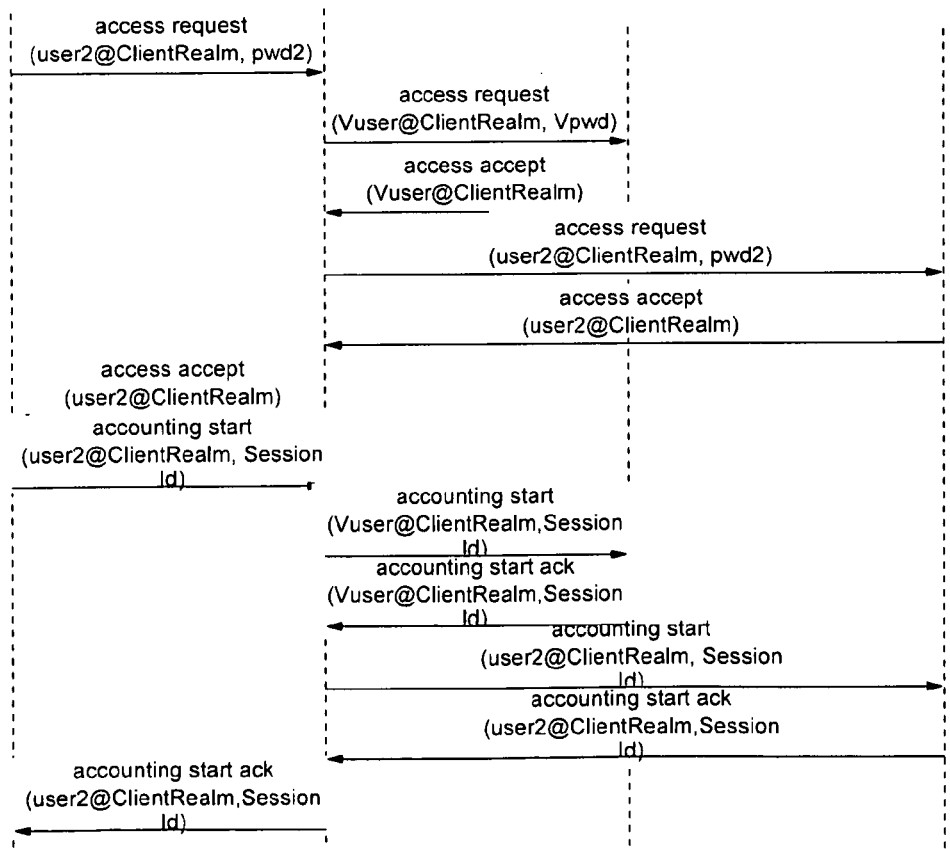

FIGS. 6 and 7 illustrate timing analysis examples of a connection process based on the algorithm described by reference to FIG. 5.

FIG. 6 depicts a first connection example concerning a Master SP's subscriber, where accounting data related to the connection is collected for billing of the subscriber. When receiving the access request from the subscriber, the NAS transmits the access request with the subscriber identifier (comprising a name and the Master's realm) and the password to the RADIUS proxy. After having determined that the access request has been sent by a Master SP's subscriber, the RADIUS proxy transmits this access request comprising a subscriber identifier and password to the Master RADIUS server for authenticating the subscriber. If the Master RADIUS server authenticates the subscriber, an access accept message is transmitted back to the RADIUS proxy. Upon reception of the access accept message, the RADIUS proxy forwards this access accept message to the NAS. Then, the NAS sends an accounting start request with the subscriber and session identifiers to the RADIUS proxy. After having determined that accounting request concerns a Master SP's subscriber, the RADIUS proxy transmits this request with the subscriber and session identifiers to the Master RADIUS server. The Master RADIUS server launches an accounting process associated with this sub-scriber and sends back an accounting start acknowledge message comprising the subscriber and session identifiers to the RADIUS proxy. This accounting start acknowledge message comprising the subscriber and session identifiers is then transmitted to the NAS.

FIG. 7 illustrates a second connection example concerning a Client SP's subscriber when a connection is established (accepted by both Master and Client SPs) and accounted for billing the Client SP and the subscriber. When receiving the access request from the subscriber, the NAS transmits the access request with the subscriber identifier (comprising a name and a realm) and the password to the RADIUS proxy. The RADIUS proxy copies the access request and modifies it to replace the subscriber identifier and password by a virtual subscriber identifier and password associated with the subscriber's realm. If there are a virtual subscriber identifier and password associated with the subscriber's realm, which is the case in this example, the modified access request is then transmitted to the Master RADIUS server. The Master RADIUS server checks access capacities allocated with Client SP. If the Client SP is allowed to create a new connection, the Master RADIUS server sends back an access accept message, comprising the virtual subscriber identifier, to the RADIUS proxy. The RADIUS proxy then transmits the original access request with the subscriber identifier and password to the Client RADIUS server. If the Client RADIUS server authenticates the subscriber, an access accept message comprising the subscriber identifier is transmitted back to the RADIUS proxy. The RADIUS proxy sends this access accept message comprising the subscriber identifier to the NAS that sends an accounting start message comprising the subscriber and session identifiers to the RADIUS proxy. The RADIUS proxy copies the accounting start message and modifies it to replace the subscriber identifier by a virtual subscriber identifier associated with the subscriber's realm. The modified accounting start message is then transmitted to the Master RADIUS server. The Master RADIUS server launches the accounting process corresponding to the Client SP associated with the subscriber and sends back an accounting start acknowledge message comprising the virtual subscriber and session identifiers to the RADIUS proxy. The RADIUS proxy then transmits the original accounting start message with the subscriber and session identifiers to the Client RADIUS server. The Client RADIUS server launches the accounting process corresponding to the subscriber and sends back an accounting start acknowledgement message comprising the subscriber and session identifiers to the RADIUS proxy. The RADIUS proxy transmits this accounting start acknowledge message comprising the subscriber and session identifiers to the NAS.

Naturally, the use of MSP points of presence by CSP subscribers must be evaluated so that the MSP may bill the CSP accordingly. At its simplest, the solution consists in billing the total connection time, independently of the number of simultaneous connections. However, MSPs generally prefer to bill CSPs according to the total connection time combined with the number of simultaneous connections. To that end, a predetermined number of connection thresholds are used as a billing basis. For example, using a single threshold q, the connection time unit could be billed at price $P_1$ when the CSP number of connections is less than q while the connection time unit could be billed at $P_2$ when the CSP number of connections is greater than q. For sake of illustration, the following description is based upon the use of three thresholds $q_1$, $q_2$, and $q_3$ ($q_1 < q_2 < q_3$, $q_3$ being the maximum number of allowed simultaneous connections). However, any number of thresholds may be used when using the method and systems of the invention.

Figure 8:
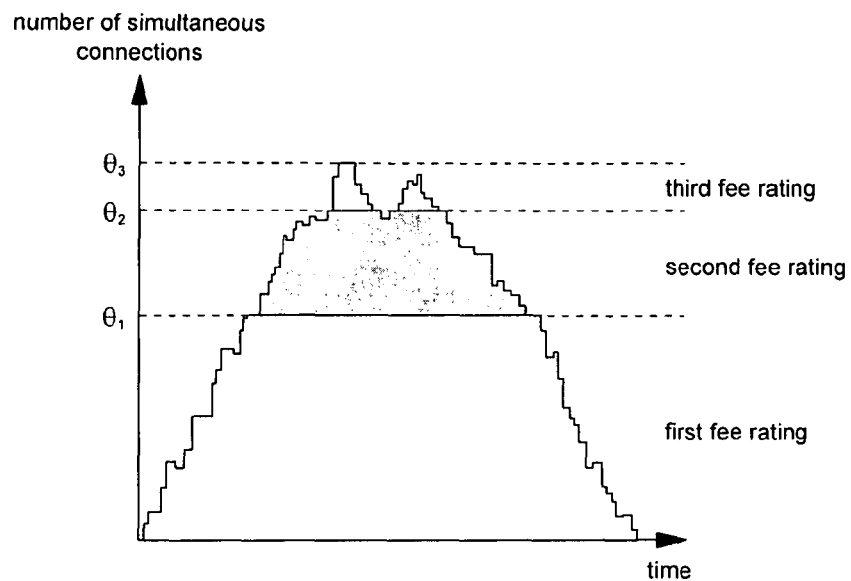
FIG. 8 depicts the general billing principle when using three thresholds $q_1$, $q_2$ and $q_3$.

FIG. 8 illustrates the general billing principle when using three thresholds $q_1$, $q_2$, and $q_3$. As shown, when the number n of simultaneous connections is less than $q_1$ ($n<q_1$), the connection time is billed according to a first fee rating. When the number n of simultaneous connections is greater than $q_1$ and less than $q_2$ ($q_1<n<q_2$), $q_1$ connections are billed according to the first fee rating and ($n-q_1$) are billed according to a second fee rating. When the number n of simultaneous connections is greater than $q_2$ ($q_2<n<q_3$), $q_1$ connections are billed according to the first fee rating, ($q_2-q_1$) are billed according to the second fee rating, and ($n-q_2$) are billed according to a third fee rating.

Figure 9:
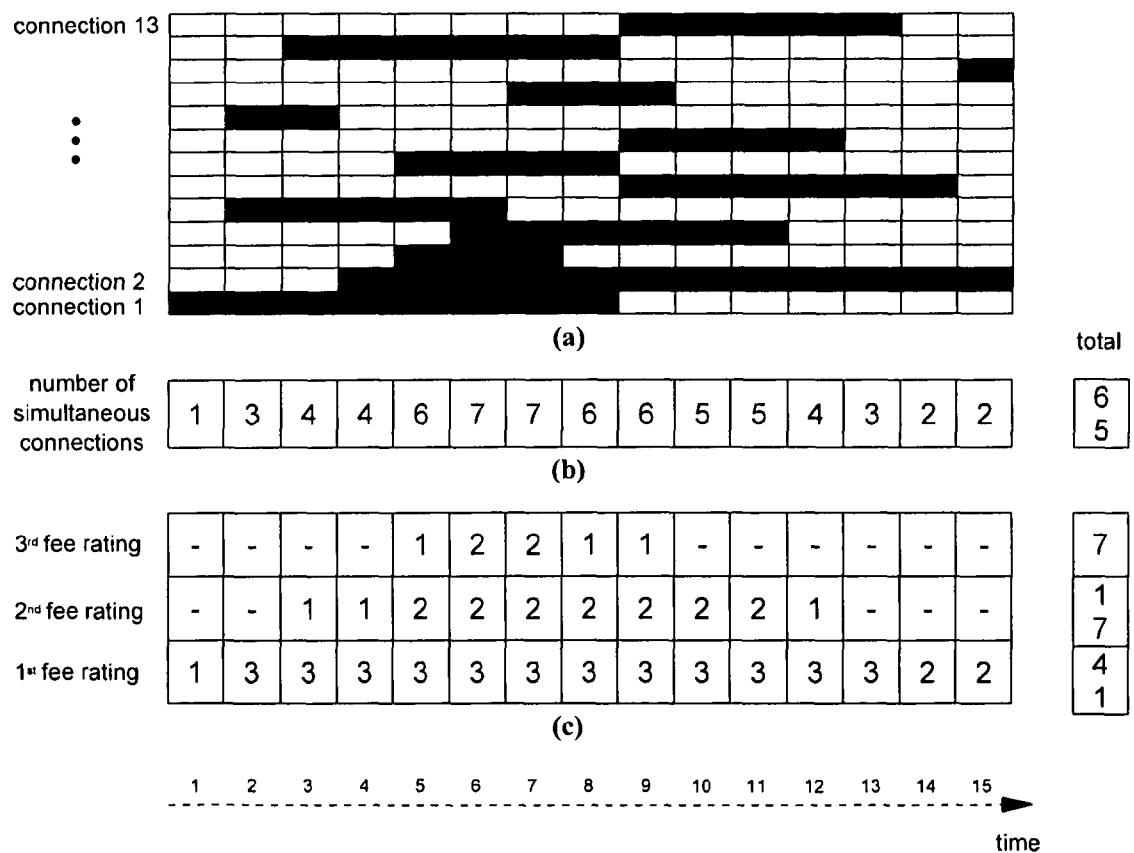
FIG. 9, comprising tables a, b and c, illustrates the general principle shown on FIG. 8.

FIG. 9, comprising tables a, b, and c, illustrates the general principle shown in FIG. 8. Table 9a depicts the establishment and duration of 13 connections, and table 9b illustrates the number of simultaneous connections. As shown, there is one connection at time 1, 3 connections at time 2, 4 connections at time 3 and so on. For sake of illustration, thresholds $q_1$, $q_2$, and $q_3$ are set to 3, 5, and 7, respectively. Therefore, at time 1, the single connection is billed according to the first fee rating, at time 2, the 3 connections are also billed according to the first fee rating, at time 3, 3 connections are billed according to the first fee rating and one connection is billed according to the second fee rating and so on. Thus, at the end of the process illustrated by the 15 steps of FIG. 9 and considering regular time periods, the connection billing is determined by the sum of connections submitted to the first fee rating, the sum of connections submitted to the second fee rating, and the sum of connections submitted to the third fee rating. For example, the price P of the connections rent by the CSP could be:

$$P=41*R_1+17*R_2+7*R_3$$

wherein $R_1$, $R_2$, and $R_3$ are the cost per time period corresponding to the first, second, and third fee rating, respectively.

According to the invention, a connection table and a threshold table characterizing connections are dynamically updated in the MSP, each time a connection is established or stopped. FIG. 10a shows an example of such a connection table 1000. As illustrated, each row corresponds to an active connection and for each active connection, the connection table stores the realm (or another CSP identifier) in column 1005, the start time in column 1010, and the billing level in column 1015. In this example, the connection table is common for all CSPs; however, a different connection table may be assigned to each CSP (or realm). In this last case, the column storing the realm is not required, but a linking table is needed to associate connection tables to realms. FIG. 10b depicts the threshold table 1020 that stores information relative to each CSP. Each row represents a different CSP (or realm). For each CSP, the CSP identifier, the thresholds, the elapsed connection times for each range of fee rating, and the number of active connections are stored in columns 1025, 1030, 1035, 1040, 1045, 1050, 1055, and 1060, respectively. Like the connection table 1000, the threshold table 1020 is common for all CSPs, but a different one may be assigned to each CSP (or realm). It is also to be noted that the number of thresholds and elapsed connection times associated with each CSP could be different for each of them.

Figures 10, 11:
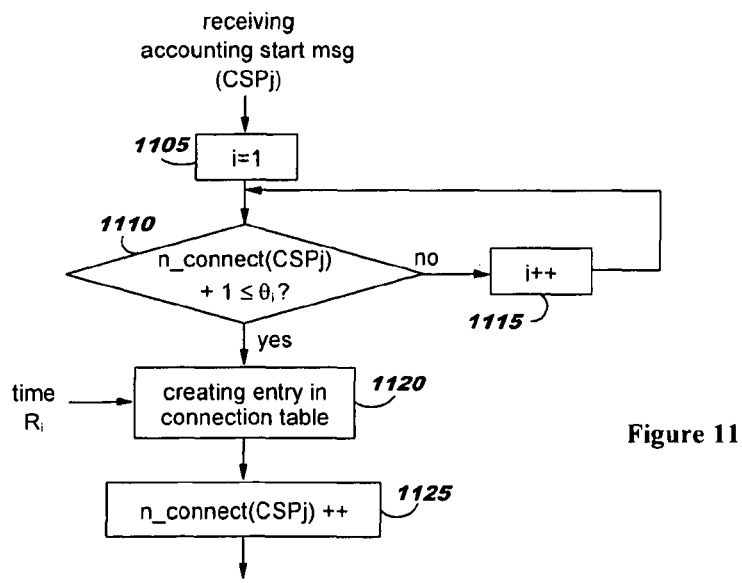
FIG. 10, comprising
FIG. 11 illustrates an example of the algorithm used for dynamically updating the connection and threshold tables in the MSP when a new connection is established.

FIG. 11 illustrates an example of the algorithm used for dynamically updating the connection and threshold tables in the MSP when a new connection is established, i.e., when an accounting start message is received. When an accounting start message concerning CSPj is received, a first step consists in setting a variable i to 1 (step 1105). Then, a first test is performed to determine if the number of active connections plus one is less than or equal to the threshold qi (step 1110). The number of active connections and the threshold qi may be read in the threshold table 1020. If the number of active connections plus one is greater than the threshold qi, variable i is incremented by one (step 1115). It is to be noted that it is not necessary to determine whether or not variable i has reached its maximum value since the number of active connections is less than the number of allowed connection (otherwise the connection request would have been rejected and no accounting start message would have been generated). If the number of active connections plus one is less than or equal to the threshold qi, a new entry is created in the connection table 1000 (step 1120). The created entry comprises the realm or another CSP identifier, the time at which connection has been established and the billing level that is determined by variable i, according to threshold qi. Then, the number of active connection that is stored in the threshold table 1020, is incremented by one (step 1125).

Figure 12:
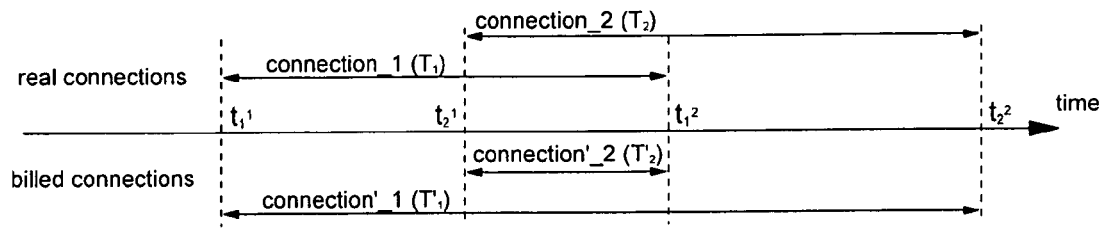
FIG. 12 shows the principle on which the computation of billing time is based.

FIG. 12 shows the principle on which the computation of billing time is based. For sake of illustration, the description is based upon two connections but increasing this number does not change the principle. In this example, the first connection, referred to as connection_1, starts at time $t_1^1$, before the second connection, referred to as connection_2, is established at time $t_2^1$, and ends at time $t_1^2$ before the second one finishes at time $t_2^2$. Therefore the connection time $T_1$ of the first subscriber is $T_1=t_1^2-t_1^1$ and the connection time $T_2$ of the second subscriber is $T_2=t_2^2-t_2^1$. The total connection time is equal to $T_1+T_2=(t_1^2-t_1^1)+(t_2^2-t_2^1)$ which may be expressed under the form $T'_1+T'_2$ wherein $T'_1=t_2^2-t_1^1$ and $T'_2=t_1^2-t_2^1$ since the addition is commutative. $T'_1$ and $T'_2$ may be analyzed as connection times corresponding to virtual connections referred to as connection'_1 and connection'_2 on FIG. 12. This latter form based on a virtual connection is preferable since it allows a direct evaluation of the connection cost when the connection established by the second subscriber is such that a connection threshold is exceeded when it is established. In such case, time $T'_1$ is billed according to a first fee rating while $T'_2$ is billed according to a second fee rating. When the connection established by the second subscriber is not such that a connection threshold is exceeded when it is established, the first form or the second one does not change billing results. Therefore the second form is used and, when a connection is stopped at a time t, the one that is associated with the higher fee rating in the connection table is selected and the corresponding start time is subtracted from the current time t, to be billed according to the corresponding higher fee rating. The connection row of the selected connection is removed from the connection table.

Figure 13:
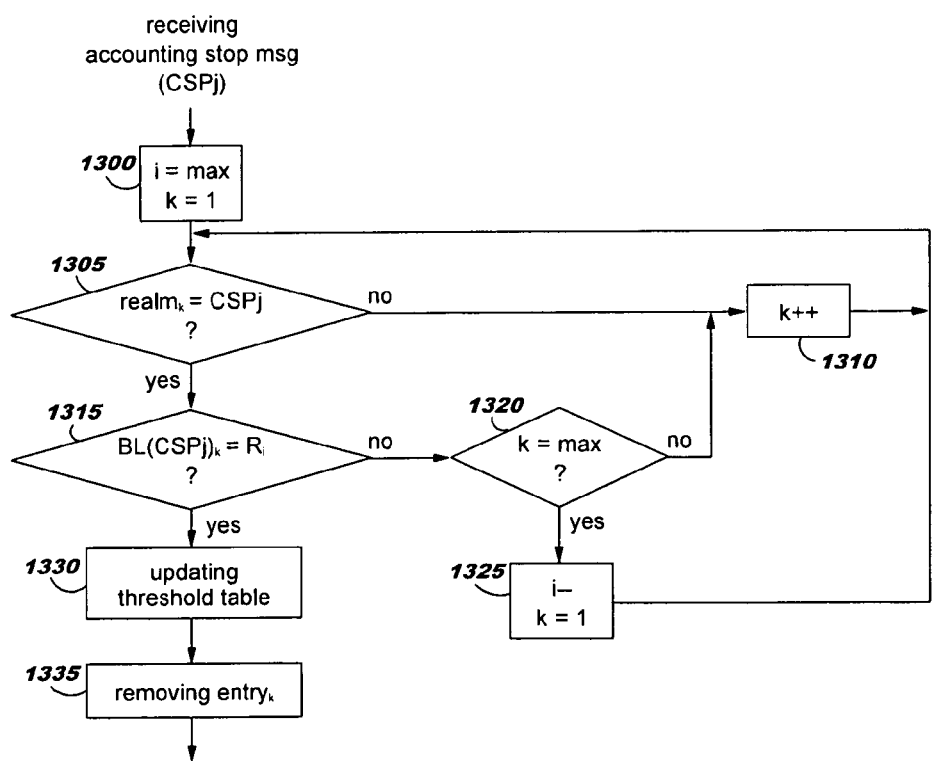
FIG. 13 illustrates an example of the algorithm used for dynamically updating the connection and threshold tables in the MSP when a connection is stopped.

FIG. 13 illustrates an example of the algorithm used for dynamically updating the connection and threshold tables in the MSP when a connection is stopped, i.e., when an accounting stop message is received. When an accounting stop message concerning CSPj is received, a first step consists in setting a variable i to its maximum value, i.e., the number of threshold associated with the corresponding CSP, and a variable k to 1 (step 1300). Then, a first test is performed to determine whether or not the record stored in the $k^{th}$ row of the connection table belongs to the same realm as the one associated with the received accounting stop message (step 1305). If the realms are not the same, variable k is incremented by one (step 1310) and the previous test (step 1305) is repeated. Else, if the realms are the same, a second test is done to determine whether or not the billing level $BL(CSPj)_k$ stored in the $k^{th}$ row of the connection table is equal to the billing level $R_i$ associated with the range $[q_{i-1},q_i]$, with $q_0=0$, (step 1315). If billing levels are different, another test is performed to determine whether or not variable k has reached its maximum value i.e., the number of row of the connection table, (step 1320). If variable k has not reached its maximum value, variable k is incremented by one (step 1310). Else, if variable k has reached its maximum value, variable k is set to one and variable i is decremented by one (step 1325). Then the first test (step 1305) is repeated. If the billing levels are the same, the threshold table is updated (step 1330). To that end, the start time value stored in the $k^{th}$ row of the connection table is subtracted from the current time and the resulting connection time is added to the one of the threshold table corresponding to the billing level of the $k^{th}$ row of the connection table and to the associated realm. The number of active connections associated with the corresponding realm is decremented by one. Then, the $k^{th}$ row of the connection table is removed (step 1335).

Therefore, billing the CSP consists in using the connection times stored in the threshold table and associated with the corresponding realm. These connection times are combined with the fee rating of each threshold range. When the connection times are used to bill the CSP, the threshold table is updated to reset corresponding connection times. Moreover, log records containing the start time and stop time, commonly referred to as Internet Protocol Data Records (IPDRs), may be generated e.g., for auditing purpose.

Naturally, it is at the CSP's discretion to accept or reject connection requests from subscribers, in particular when the number of simultaneous connections reaches a predetermined threshold. Such acceptation/rejection may depend, for example, upon subscriber's contract details.

The method and systems of the invention may be used in conjunction with telephone switch equipment supporting hunting features. Hunting features allow the automatic routing of calls directed to an initial group of lines, when all the lines of the this initial group are busy, to other line(s) in a predetermined group. Thus, when a sub-scriber of a Client SP initializes a call to a Client SP's POP, using a particular called-number, the call may be automatically transmitted to a Master SP's POP, having another call-in number, if the CSP's number is busy. In such case, the subscriber does not need to re-dial another call-in number and so, does not need to store all the numbers of the Master SPs renting access capacities to the subscriber's CSP.

Naturally, in order to satisfy local and specific requirements, a person skilled in the art may apply to the solution described above many modifications and alterations all of which, however, are included within the scope of protection of the invention as defined by the following claims.

The invention claimed is:

1. A system for determining a time period of sharing network access capacities between a Master Service Provider, comprising at least one Point Of Presence including at least one port, and a Client Service Provider, the time period of sharing network access capacities being determined according to at least one threshold representing a predetermined shared network access capacity amount and defining at least two ranges, a range time period being associated with each of the ranges, comprising:
   at least one computer or machine adapted to determine a time period of sharing network access capacities by performing actions comprising:
   initializing the range time period associated with each of the ranges;
   comparing, when a port of the at least one Point Of Access of the Master Service Provider is used to establish a connection requested by a subscriber of the Client Service Provider, a number of ports of the at least one Points Of Presence of the Master Service Provider used by subscribers of the Client Service Provider with the at least one threshold to determine the associated range and storing a time at which the connection is established in relation with the associated range;
   determining, when one port of the at least one Points Of Presence of the Master Service Provider used by a subscriber of the Client Service Provider is released, a higher range to which a stored time is associated;
   selecting a stored time in relation with the determined range;

subtracting the selected time from the time at which the port of the at least one Point Of Presence of the Master Service Provider is released;

adding the result of the subtraction to the time period associated with the determined range;

deleting the selected time;

storing a number of simultaneous connections established for subscribers of the Client Service Provider in a table and updating the table each time a connection is established or released; and billing the Client Service Provider based on the number of simultaneous connections established for subscribers of the Client Service Provider stored in the table.

2. The system according to claim 1 wherein an identifier of the Client Service Provider is associated with the stored times and with the time periods.

3. The system of claim 2 the actions further comprising comparing the Client Service Provider identifier of the subscriber having released a port with the identifier associated with the stored times and with the time periods so as to select a stored time and a time period sharing the same identifier as the Client Service Provider identifier of the subscriber having released a port.

4. The system of claim 2 wherein the identifier is a realm of the Client Service Provider.

5. The system of claim 1 implemented in a RADIUS proxy, using a RADIUS protocol.

* * * * *